United States Patent
Chaneyalew et al.

(10) Patent No.: US 6,896,591 B2
(45) Date of Patent: May 24, 2005

(54) MIXED-ABRASIVE POLISHING COMPOSITION AND METHOD FOR USING THE SAME

(75) Inventors: Atenafu N. Chaneyalew, Aurora, IL (US); Tao Sun, Naperville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 13 days.

(21) Appl. No.: 10/364,243

(22) Filed: Feb. 11, 2003

(65) Prior Publication Data

US 2004/0157535 A1 Aug. 12, 2004

(51) Int. Cl.$^7$ ................................................. B24B 1/00
(52) U.S. Cl. .......................... 451/41; 451/60; 451/287; 451/288; 451/446
(58) Field of Search ............................ 451/41, 60, 287, 451/288, 446

(56) References Cited

U.S. PATENT DOCUMENTS

| | | | |
|---|---|---|---|
| 5,500,273 A | * | 3/1996 | Holmes et al. ............. 428/147 |
| 5,693,239 A | | 12/1997 | Wang et al. |
| 5,942,015 A | * | 8/1999 | Culler et al. ................... 51/295 |
| 6,261,476 B1 | | 7/2001 | Kwok et al. |
| 6,293,848 B1 | | 9/2001 | Fang et al. |
| 2002/0023389 A1 | | 2/2002 | Minamihaba et al. |

FOREIGN PATENT DOCUMENTS

| | | |
|---|---|---|
| EP | 0786504 | 7/1997 |
| WO | WO 93/22103 | 11/1993 |

* cited by examiner

*Primary Examiner*—Joseph J. Hail, III
*Assistant Examiner*—Shantese McDonald

(57) ABSTRACT

The invention provides a polishing composition comprising (i) an abrasive comprising (a) about 5 to about 45 wt. % of first abrasive particles having a Mohs' hardness of about 8 or more, (b) about 1 to about 45 wt. % of second abrasive particles having a three-dimensional structure comprising aggregates of smaller primary particles, and (c) about 10 to about 90 wt. % of third abrasive particles comprising silica, and (ii) a liquid carrier. The invention also provides a method of polishing a substrate, which method comprises the steps of (i) providing the above-described polishing composition, (ii) providing a substrate having a surface, and (iii) abrading at least a portion of the substrate surface with the polishing composition to polish the substrate.

39 Claims, No Drawings

MIXED-ABRASIVE POLISHING COMPOSITION AND METHOD FOR USING THE SAME

FIELD OF THE INVENTION

This invention pertains to chemical-mechanical polishing compositions containing mixed abrasives and their use to polish substrates, especially nickel-containing substrates.

BACKGROUND OF THE INVENTION

Compositions and methods for planarizing or polishing the surface of a substrate are well known in the art. Polishing compositions (also known as polishing slurries) typically contain an abrasive material in an aqueous solution and are applied to a surface by contacting the surface with a polishing pad saturated with the polishing composition. Typical abrasive materials include silicon dioxide, cerium oxide, aluminum oxide, zirconium oxide, and tin oxide. U.S. Pat. No. 5,527,423, for example, describes a method for chemically-mechanically polishing a metal layer by contacting the surface with a polishing composition comprising high purity fine abrasive particles in an aqueous medium. The polishing composition typically is used in conjunction with a polishing pad (e.g., polishing cloth or disk). Suitable polishing pads are described in U.S. Pat. Nos. 6,062,968, 6,117,000, and 6,126,532, which disclose the use of sintered polyurethane polishing pads having an open-celled porous network, and U.S. Pat. No. 5,489,233, which discloses the use of solid polishing pads having a surface texture or pattern. Alternatively, the abrasive material may be incorporated into the polishing pad. U.S. Pat. No. 5,958,794 discloses a fixed abrasive polishing pad.

Conventional polishing systems and polishing methods typically are not entirely satisfactory at planarizing substrates, especially memory disks. In particular, such polishing systems and polishing methods can result in less than desirable polishing rates and high surface defectivity when applied to memory or rigid disks. Because the performance of many substrates, such as memory disks, is directly associated with the planarity of its surface, it is crucial to use a polishing system and method that results in a high polishing efficiency, selectivity, uniformity, and removal rate and that leaves a high quality polish with minimal surface defects.

There have been many attempts to improve the removal rate of memory or rigid disks during polishing, while minimizing defectivity of the polished surface during polishing. For example, U.S. Pat. No. 4,769,046 discloses a method for polishing a nickel-plated layer on a rigid disk using a composition comprising alumina abrasive and a polishing accelerator such as nickel nitrate, aluminum nitrate, or mixtures thereof. U.S. Pat. No. 6,015,506 discloses a method for polishing a rigid disk using a polishing composition comprising a dispersion of an abrasive, an oxidizing agent, and a catalyst having multiple oxidation states. WO 02/20214 discloses a method for polishing a memory or rigid disk substrate using a polishing composition comprising an oxidized halide and an amino acid.

A need remains, however, for polishing systems and polishing methods that will exhibit desirable planarization efficiency, selectivity, uniformity, and removal rate during the polishing and planarization of substrates, especially memory disks, while minimizing defectivity, such as surface imperfections and damage to underlying structures and topography during polishing and planarization.

The invention provides such a polishing composition and method. These and other advantages of the invention, as well as additional inventive features, will be apparent from the description of the invention provided herein.

BRIEF SUMMARY OF THE INVENTION

The invention provides a polishing composition comprising (i) an abrasive comprising (a) about 5 to about 45 wt. % of first abrasive particles having a Mohs' hardness of about 8 or more, (b) about 1 to about 45 wt. % of second abrasive particles having a three-dimensional structure comprising aggregates of smaller primary particles, and (c) about 10 to about 90 wt. % of third abrasive particles comprising silica, and (ii) a liquid carrier. The invention also provides a method of polishing a substrate, which method comprises the steps of (i) providing the aforementioned polishing composition, (ii) providing a substrate having a surface, and (iii) abrading at least a portion of the substrate surface with the polishing composition to polish the substrate.

DETAILED DESCRIPTION OF THE INVENTION

The invention provides a polishing composition comprising (i) an abrasive and (ii) a liquid carrier. The abrasive comprises (a) about 5 to about 45 wt. % of first abrasive particles having a Mohs' hardness of about 8 or more, (b) about 1 to about 45 wt. % of second abrasive particles having a three-dimensional structure comprising aggregates of smaller primary particles, and (c) about 10 to about 90 wt. % of third abrasive particles comprising silica.

As noted above, the first abrasive particles used in conjunction with the invention have a Mohs' hardness of about 8 or more. Preferably, the first abrasive particles have a Mohs' hardness of about 8.5 or more, more preferably about 9 or more. As utilized herein, the term "Mohs' hardness" refers the scale of relative hardness used to compare the relative scratch hardness of substances (e.g., minerals). The Mohs' hardness scale is ordered by assigning hardness values to certain common minerals, and the Mohs' hardness value is determined by comparing the scratch hardness of the subject materials to the scratch hardness of the standards. In particular, the Mohs' scale is ordered by assigning a hardness value of 1 to talc and a hardness value of 10 to diamond.

The hardness of the first abrasive particles also can be measured by other means. For instance, the hardness of the first abrasive particles can be measured using the Knoop hardness scale. Generally, the Knoop hardness is measured by forcing a diamond indenter of pyramidal shape into the test material under a fixed load (e.g., 100 g). Suitable methods for determining the Knoop hardness of a material are set forth in American Society for Testing and Materials (ASTM) Standard E384-99e1, entitled "Standard Test Method for Microindentation Hardness of Materials." The Knoop hardness value of a particular abrasive is considered to be within the ranges set forth herein when determined by any one of the techniques for determining Knoop hardness set forth in ASTM Standard E384-99e1. First abrasive particles suitable for use in the invention typically have a Knoop hardness (in $kN/m^2$) of about 15 or more, more preferably about 17 or more, and most preferably about 20 or more.

The first abrasive particles suitable for use in the invention can be any suitable abrasive particles having the aforementioned hardness properties. Preferably, the first abrasive particles are selected from the group consisting of aluminum oxides (e.g., α-alumina alumina), carbides, diamond (natural and synthetic), nitrides, zirconium oxides, coformed particles thereof, and combinations thereof. Most preferably, the first abrasive particles are α-alumina particles.

The first abrasive particles can have any suitable size. Typically, the first abrasive particles have a mean particle size of about 1 μm or less, preferably about 500 nm or less, more preferably about 400 nm or less, and most preferably about 300 nm or less.

The first abrasive particles are present in the abrasive in an amount of about 5 to about 45 wt. % based on the total weight of the abrasive. Preferably, the first abrasive particles are present in the abrasive in an amount of about 10 wt. % or more, more preferably about 15 wt. % or more based on the total weight of the abrasive. Also, the first abrasive particles preferably are present in the abrasive in an amount of about 40 wt. % or less, more preferably about 30 wt. % or less, and most preferably about 25 wt. % or less, based on the total weight of the abrasive.

The second abrasive particles used in conjunction with the invention have a three-dimensional structure comprising aggregates of smaller primary particles. The aggregate particles of smaller primary particles are held together by relatively strong cohesive forces, such that the aggregate particles are not broken down into primary particles when dispersed in a liquid (e.g., aqueous) medium. In that respect, aggregate particles differ from agglomerates. Second abrasive particles suitable for use in the invention include, but are not limited to, fumed metal oxide particles. As utilized herein, the term "fumed metal oxide particles" refers to metal oxide particles produced by pyrogenic processes, such as the vapor phase hydrolysis of a metal oxide precursor. Preferably, the second abrasive particles are selected from the group consisting of fumed alumina, fumed silica, and mixtures thereof. More preferably, the second abrasive particles are fumed alumina particles.

The second abrasive particles used in the invention can have any suitable size. Preferably, the second abrasive particles have a mean aggregate particle size of about 300 nm or less, more preferably about 250 nm or less, and most preferably about 200 nm or less. Also, the second abrasive particles preferably have a mean primary particle size of about 100 nm or less, more preferably about 50 nm or less, and most preferably about 40 nm or less.

The second abrasive particles are present in the abrasive in an amount of about 1 to about 45 wt. % based on the total weight of the abrasive. Preferably, the second abrasive particles are present in the abrasive in an amount of about 40 wt. % or less (e.g., about 15 to about 40 wt. %), more preferably about 30 wt. % or less, still more preferably about 20 wt. % or less, and most preferably about 10 wt. % or less (e.g., about 1 to about 10 wt. %), based on the total weight of the abrasive.

The third abrasive particles used in conjunction with the invention can comprise any suitable silica. Suitable silicas include, but are not limited to, precipitated silica, condensation-polymerized silica, colloidal silica, and mixtures thereof. Preferably, the silica is colloidal silica. As utilized herein, the term "colloidal silica" refers to silica particles that can form stable dispersions in water (i.e., the particles do not agglomerate and fall out of suspension) due to their small particle size (e.g., about 1 μm or less, or about 500 nm or less). Generally, colloidal silica particles are discrete, substantially spherical silica particles having no internal surface area. Colloidal silica typically is produced by wet-chemistry processes, such as the acidification of an alkaline metal silicate-containing solution. The third abrasive particles can have any suitable size. Preferably, the third abrasive particles have a mean particle size of about 200 nm or less, more preferably about 150 nm or less, and most preferably about 130 nm or less.

The third abrasive particles are present in the abrasive in an amount of about 10 to about 90 wt. %, based on the total weight of the abrasive. Preferably, the third abrasive particles are present in the abrasive in an amount of about 20 wt. % or more. Also, the third abrasive particles preferably are present in the abrasive in an amount of about 85 wt. % or less, more preferably about 80 wt. % or less (e.g., about 70 to about 80 wt. %), and most preferably about 70 wt. % or less (e.g., about 20 to about 70 wt. %), based on the total weight of the abrasive.

The abrasive can be present in the polishing composition in any suitable amount. The total amount of abrasive present in the polishing composition typically is about 0.1 wt. % or more, more preferably about 0.5 wt. % or more, and most preferably about 1 wt. % or more, based on the total weight of the polishing composition. Typically, the total amount of abrasive present in the polishing composition is about 20 wt. % or less, more preferably about 10 wt. % or less, and most preferably about 6 wt. % or less, based on the total weight of the polishing composition.

Alternatively, the polishing composition can be formulated as a precursor composition containing higher amounts of the abrasive and other optional components. In this embodiment, the total amount of abrasive present in the polishing composition typically is about 80 wt. % or less, more preferably about 50 wt. % or less, and most preferably about 30 wt. % or less.

The liquid carrier can be any suitable carrier (e.g., solvent). Suitable liquid carriers include, for example, aqueous carriers (e.g., water) and non-aqueous carriers. Preferably, the liquid carrier is water, more preferably de-ionized water.

The polishing composition can further comprise an acid. In certain embodiments, the acid is an inorganic acid. Preferably, the inorganic acid is selected from the group consisting of nitric acid, phosphoric acid, sulfuric acid, salts thereof, and combinations thereof. The acid also can be an organic acid. Preferably, the organic acid is selected from the group consisting of oxalic acid, malonic acid, tartaric acid, acetic acid, lactic acid, propionic acid, phthalic acid, benzoic acid, citric acid, succinic acid, salts thereof, and combinations thereof.

The polishing composition can have any suitable pH. Typically, the polishing composition has a pH of about 0 or higher, preferably about 1 or higher. The pH of the polishing composition is typically about 7 or less, preferably about 6 or less, and more preferably about 5 or less. In a preferred embodiment, the polishing composition has a pH of about 1 to about 4 (e.g., about 2 to about 3, or about 2 to about 2.5).

The polishing composition can further comprise a surfactant. Suitable surfactants include, but are not limited to, cationic surfactants, anionic surfactants, nonionic surfactants, amphoteric surfactants, fluorinated surfactants, and mixtures thereof.

The polishing composition can further comprise a chemical oxidizing agent. The chemical oxidizing agent can be any suitable oxidizing agent. Suitable oxidizing agents include inorganic and organic per-compounds, bromates, nitrates, chlorates, chromates, iodates, iron and copper salts (e.g., nitrates, sulfates, EDTA, and citrates), rare earth and transition abrasives (e.g., osmium tetraoxide), potassium ferricyanide, potassium dichromate, iodic acid, and the like. A per-compound (as defined by Hawley's Condensed Chemical Dictionary) is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-tert-butyl peroxide, monopersulfates ($SO_5^{2-}$), dipersulfates ($S_2O_8^{2-}$), and sodium peroxide. Examples of compounds containing an element in its highest oxidation state include but are not limited to periodic acid, periodate salts, perbromic acid, perbromate salts, perchloric acid, perchlorate salts, perboric acid, perborate salts, and permanganates. The oxidizing agent preferably is hydrogen peroxide.

Any suitable amount of the oxidizing agent can be present in the polishing composition. Preferably, the oxidizing agent is present in the polishing composition in an amount of about 0.01 wt. % or more, more preferably about 0.3 wt. % or more, and most preferably about 0.5 wt. % or more, based on the total weight of the polishing composition. Also, the oxidizing agent preferably is present in the polishing composition in an amount of about 30 wt. % or less, more preferably about 20 wt. % or less, and most preferably about 10 wt. % or less, based on the total weight of the polishing composition.

The polishing composition can further comprise a chelating or complexing agent. The complexing agent can be any suitable chemical additive that enhances the removal rate of the substrate layer being removed. Suitable chelating or complexing agents can include, for example, carbonyl compounds (e.g., acetylacetonates, and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), polyacrylates, mixtures thereof, and the like), carboxylates containing one or more sulfonic and/or phosphonic groups, and the like. Suitable chelating or complexing agents also can include, for example, di-, tri-, or polyalcohols (e.g., ethylene glycol, pyrocatechol, pyrogallol, tannic acid, and the like) and amine-containing compounds (e.g., ammonia, amino acids, amino alcohols, di-, tri-, and polyamines, and the like). Preferably, the complexing agent is a carboxylate salt, more preferably an oxalate salt. The choice of chelating or complexing agent will depend on the type of substrate layer being removed.

The chelating or complexing agent can be present in the polishing composition in any suitable amount. Preferably, the chelating or complexing agent is present in the polishing composition in an amount of about 0.1 wt. % or more, more preferably about 0.5 wt. % or more, and most preferably about 1 wt. % or more, based on the total weight of the polishing composition. Also, the chelating or complexing agent preferably is present in the polishing composition in an amount of about 20 wt. % or less, more preferably about 15 wt. % or less, and most preferably about 10 wt. % or less, based on the total weight of the polishing composition.

The polishing composition of the invention can be prepared by any suitable method. Generally, the polishing composition is prepared by (i) providing an appropriate amount of liquid carrier, (ii) optionally adding suitable amounts of an acid, a surfactant, an oxidizing agent, a chelating or complexing agent, or combinations thereof, and (iii) dispersing the desired amounts of first abrasive particles, second abrasive particles, and third abrasive particles in the resulting mixture. The first abrasive particles, second abrasive particles, and third abrasive particles can be dispersed in the liquid carrier using any suitable apparatus (e.g., a high-shear mixer). The aforementioned method also can be used to prepare the polishing composition when it is formulated as a precursor composition. Typically, such a precursor composition would be diluted with an appropriate amount of a suitable liquid carrier (e.g., about 3 parts de-ionized water to about 1 part precursor composition) before being used to polish a substrate.

The invention further provides a method of polishing a substrate with the polishing composition described herein. In particular, the invention provides a method of polishing a substrate, which method comprises the steps of (i) providing a polishing composition comprising (a) an abrasive comprising (I) about 5 to about 45 wt. % of first abrasive particles having a Mohs' hardness of about 8 or more, (II) about 1 to about 45 wt. % of second abrasive particles having a three-dimensional structure comprising aggregates of smaller primary particles, and (III) about 10 to about 90 wt. % of third abrasive particles comprising silica, and (b) a liquid carrier, (ii) providing a substrate having a surface, and (iii) abrading at least a portion of the substrate surface with the polishing composition to polish the substrate.

The polishing composition and method can be used to polish any suitable substrate. Preferably, the substrate comprises at least one metal layer. Suitable substrates include, but are not limited to, integrated circuits, memory or rigid disks, metals, interlayer dielectric (ILD) devices, semiconductors, micro-electro-mechanical systems, ferroelectrics, and magnetic heads. The metal layer can comprise any suitable metal. For example, the metal layer can comprise copper, tantalum, titanium, aluminum, nickel, platinum, ruthenium, iridium, or rhodium. The substrate can further comprise at least one insulating layer. The insulating layer can be an abrasive, porous abrasive, glass, organic polymer, fluorinated organic polymer, or any other suitable high or low-κ insulating layer. Preferably, the substrate comprises a nickel-phosphorous layer (e.g., a memory or rigid disk).

The polishing method of the invention is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the polishing composition of the invention and then the polishing pad moving relative to the substrate, so as to abrade at least a portion of the substrate to polish the substrate.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. Nos. 5,196,353, 5,433,651, 5,609,511, 5,643,046, 5,658,183, 5,730,642, 5,838,447, 5,872,633, 5,893,796, 5,949,927, and 5,964,643. Desirably, the inspection or monitoring of the progress of the polishing process with respect to a workpiece being polished enables the determination of the polishing end-point, i.e., the determination of when to terminate the polishing process with respect to a particular workpiece.

The polishing method of the invention is equally well suited for use in conjunction with a polishing apparatus designed for polishing memory or rigid disks. Typically, the apparatus comprises a pair of platens (i.e., an upper platen and a lower platen) and a pair of polishing pads (i.e., an upper polishing pad mounted to the upper platen and a lower polishing pad mounted to the lower platen). The upper platen and upper polishing pad have a series of holes or channels formed therein which allow the polishing composition or slurry to pass through the upper platen and upper polishing pad to the surface of the rigid disks being polished. The lower platen further comprises a series of inner and outer gears, which are used to rotate one or more disk carriers. The carriers hold one or more rigid disks so that each major surface (i.e., upper and lower surface) of the rigid disk can contact the upper or lower polishing pad. When in use, the surfaces of the rigid disks are brought into contact with the polishing pads and the polishing composition or slurry, and the upper and lower platens are independently rotated about a common axis. The gears of the lower platen also are driven so that the carriers rotate about an axis or axes within the surface of the upper and lower platens and/or upper and lower polishing pads. The resulting combination of circular motion (due to the rotation of the platens and polishing pads) and orbital motion (due to the rotation of the carriers) evenly polishes the upper and lower surfaces of the rigid disks.

The CMP apparatus can further comprise a means for oxidizing the substrate. In electrochemical polishing systems, the means for oxidizing the substrate preferably comprises a device for applying a time-varying potential (e.g., anodic potential) to the substrate (e.g., electronic potentiostat). The device for applying time-varying potential to the substrate can be any suitable such device. The means for oxidizing the substrate preferably comprises a device for applying a first potential (e.g., a more oxidizing potential) during an initial stage of the polishing and applying a second potential (e.g., a less oxidizing potential) at or during a later stage of polishing, or a device for changing the first potential to the second potential during an intermediate stage of polishing, e.g., continuously reducing the potential during the intermediate stage or rapidly reducing the potential from a first, higher oxidizing potential to a second, lower oxidizing potential after a predetermined interval at the first, higher oxidizing potential. For example, during the initial stage(s) of the polishing, a relatively high oxidizing potential is applied to the substrate to promote a relatively high rate of oxidation/dissolution/removal of the substrate. When polishing is at a later stage, e.g., when approaching an underlying barrier layer, the applied potential is reduced to a level producing a substantially lower or negligible rate of oxidation/dissolution/removal of the substrate, thereby eliminating or substantially reducing dishing, corrosion, and erosion. The time-varying electrochemical potential is preferably applied using a controllably variable DC power supply, e.g., an electronic potentiostat. U.S. Pat. No. 6,379,223 further describes a means for oxidizing a substrate by applying a potential.

EXAMPLE

This example further illustrates the invention but, of course, should not be construed as in any way limiting its scope. In particular, this example demonstrates a method for polishing a substrate according to the invention.

Similar substrates comprising a nickel-phosphorous layer were polished with six polishing compositions (Polishing Compositions A, B, C, D, E, and F), each of which contained 0.8 wt. % tartaric acid and 1 wt. % hydrogen peroxide and was used in conjunction with the same polishing apparatus and polishing pad. Polishing Composition A (comparative) contained 0.8 wt. % α-alumina particles (250 nm mean particle size), which has a Mohs' hardness of about 8 or more, based on the total weight of the polishing composition. Polishing Composition B (comparative) contained 0.2 wt. % fumed alumina particles, which have a three-dimensional structure comprising aggregates of smaller primary particles, based on the total weight of the polishing composition. Polishing Composition C (comparative) contained 3 wt. % colloidal silica particles based on the total weight of the polishing composition. Polishing Composition D (comparative) contained 0.8 wt. % α-alumina particles (250 nm mean particle size) and 0.2 wt. % fumed alumina particles, based on the total weight of the polishing composition. Polishing Composition E (invention) contained 0.8 wt. % α-alumina particles (250 nm mean particle size), 0.2 wt. % fumed alumina particles, and 3 wt. % colloidal silica particles, based on the total weight of the polishing composition. Polishing Composition F (invention) contained 0.8 wt. % α-alumina particles, (350 nm mean particle size), 0.2 wt. % fumed alumina particles, and 3 wt. % colloidal silica particles, based on the total weight of the polishing composition.

The removal rate for each of the polishing compositions was measured, as well as the surface roughness and full surface waviness (5 mm cutoff) of the substrate after polishing. The surface roughness of each polished substrate was determined using a TMS 2000 Texture Measurement System (39 μm) available from Schmitt Measurement Systems, and the full surface waviness was measured using an Optiflat system available from Phase Shift Technology. The results for each of the polishing compositions are summarized in the Table.

TABLE

Removal Rates, Surface Roughness, and Full Surface Waviness (5 mm cutoff)

| Polishing Composition | Removal Rate (mg/min) | Surface Roughness ($R_a$) (Å) | Full Surface Waviness ($W_a$) (Å) |
| --- | --- | --- | --- |
| A | 18.20 | 19.7 | 21.54 |
| B | 22.13 | 6.79 | 13.13 |
| C | 12.23 | 1.95 | 8.2 |
| D | 29.47 | 8.05 | 288.01 |
| E | 29.35 | 5.02 | 5.63 |
| F | 33.5 | 6.37 | 4.14 |

As can be seen from the results, a polishing composition according to the invention exhibits a higher removal rate, lower surface roughness, and lower full surface waviness as compared to other polishing compositions. In particular, Polishing Compositions E (invention) and F (invention) exhibited lower full surface waviness than each of the comparative polishing compositions and higher removal rates than each of the comparative polishing compositions except Polishing Composition D (comparative). However, the surface roughness and full surface waviness values for Polishing Composition D are much greater than those obtained using Polishing Compositions E and F. While Polishing Composition C (comparative) exhibited a relatively low surface roughness value, the removal rate was less than half of the removal rate for Polishing Compositions E and F, and the full surface waviness also was higher than those obtained using Polishing Compositions E and F.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A polishing composition comprising:
   (i) an abrasive comprising (a) about 5 to about 45 wt. % of first abrasive particles having a Mohs' hardness of about 8 or more, (b) about 1 to about 45 wt. % of second abrasive particles having a three-dimensional structure comprising aggregates of smaller primary particles, and (c) about 10 to about 90 wt. % of third abrasive particles comprising silica, and
   (ii) a liquid carrier.

2. The polishing composition of claim 1, wherein the first abrasive particles are α-alumina particles.

3. The polishing composition of claim 1, wherein the second abrasive particles are fumed alumina particles.

4. The polishing composition of claim 1, wherein the silica is colloidal silica.

5. The polishing composition of claim 1, wherein the liquid carrier comprises water.

6. The polishing composition of claim 1, wherein the abrasive is present in an amount of about 0.5 to about 20 wt. % based on the total weight of the polishing composition.

7. The polishing composition of claim 6, wherein the abrasive is present in an amount of about 1 to about 6 wt. % based on the total weight of the polishing composition.

8. The polishing composition of claim 1, wherein the abrasive comprises (a) about 15 to about 40 wt. % of the first abrasive particles, (b) about 15 to about 40 wt. % of the second abrasive particles, and (c) about 20 to about 70 wt. % of the third abrasive particles.

9. The polishing composition of claim 1, wherein the abrasive comprises (a) about 15 to about 25 wt. % of the first abrasive particles, (b) about 1 to about 10 wt. % of the second abrasive particles, and (c) about 70 to about 80 wt. % of the third abrasive particles.

10. The polishing composition of claim 1, wherein the first abrasive particles have a mean particle size of about 1 μm or less.

11. The polishing composition of claim 10, wherein the first abrasive particles have a mean particle size of about 400 nm or less.

12. The polishing composition of claim 1, wherein the second abrasive particles have a mean aggregate particle size of about 200 nm or less.

13. The polishing composition of claim 1, wherein the third abrasive particles have a mean particle size of about 150 nm or less.

14. The polishing composition of claim 1, wherein the polishing composition further comprises an oxidizing agent.

15. The polishing composition of claim 14, wherein the oxidizing agent comprises hydrogen peroxide.

16. The polishing composition of claim 1, wherein the polishing composition further comprises an acid.

17. The polishing composition of claim 16, wherein the acid is an organic acid.

18. The polishing composition of claim 17, wherein the organic acid is selected from the group consisting of oxalic acid, malonic acid, tartaric acid, acetic acid, lactic acid, propionic acid, phthalic acid, benzoic acid, citric acid, succinic acid, salts thereof, and combinations thereof.

19. The polishing composition of claim 1, wherein the polishing composition has a pH of about 1 to about 4.

20. A method of polishing a substrate, which method comprises the steps of:
   (i) providing a polishing composition comprising:
      (a) an abrasive comprising (I) about 5 to about 45 wt. % of first abrasive particles having a Mohs' hardness of about 8 or more, (II) about 1 to about 45 wt. % of second abrasive particles having a three-dimensional structure comprising aggregates of smaller primary particles, and (III) about 10 to about 90 wt. % of third abrasive particles comprising silica, and
      (b) a liquid carrier,
   (ii) providing a substrate having a surface, and
   (iii) abrading at least a portion of the substrate surface with the polishing composition to polish the substrate.

21. The method of claim 20, wherein the first abrasive particles are α-alumina particles.

22. The method of claim 20, wherein the second abrasive particles are fumed alumina particles.

23. The method of claim 20, wherein the silica is colloidal silica.

24. The method of claim 20, wherein the liquid carrier comprises water.

25. The method of claim 20, wherein the abrasive is present in an amount of about 0.5 to about 20 wt. % based on the total weight of the polishing composition.

26. The method of claim 25, wherein the abrasive is present in an amount of about 1 to about 6 wt. % based on the total weight of the polishing composition.

27. The method of claim 20, wherein the abrasive comprises (a) about 15 to about 40 wt. % of the first abrasive particles, (b) about 15 to about 40 wt. % of the second abrasive particles, and (c) about 20 to about 70 wt. % of the third abrasive particles.

28. The method of claim 20, wherein the abrasive comprises (a) about 15 to about 25 wt. % of the first abrasive particles, (b) about 1 to about 10 wt. % of the second abrasive particles, and (c) about 70 to about 80 wt. % of the third abrasive particles.

29. The method of claim 20, wherein the first abrasive particles have a mean particle size of about 1 μm or less.

30. The method of claim 29, wherein the first abrasive particles have a mean particle size of about 500 nm or less.

31. The method of claim 20, wherein the second abrasive particles have a mean aggregate particle size of about 200 nm or less.

32. The method of claim 20, wherein the third abrasive particles have a mean particle size of about 150 nm or less.

33. The method of claim 20, wherein the polishing composition further comprises an oxidizing agent.

34. The method of claim 33, wherein the oxidizing agent comprises hydrogen peroxide.

35. The method of claim 20, wherein the polishing composition further comprises an acid.

36. The method of claim 35, wherein the acid is an organic acid.

37. The method of claim 36, wherein the organic acid is selected from the group consisting of oxalic acid, malonic acid, tartaric acid, acetic acid, lactic acid, propionic acid, phthalic acid, benzoic acid, citric acid, succinic acid, salts thereof, and combinations thereof.

38. The method of claim 20, wherein the polishing composition has a pH of about 1 to about 4.

39. The method of claim 20, wherein the substrate comprises a nickel-phosphorous layer.

* * * * *